United States Patent
Rose et al.

(10) Patent No.: US 10,493,736 B2
(45) Date of Patent: Dec. 3, 2019

(54) UNDERLAY MAT FOR FLOOR COVERINGS

(71) Applicant: WPT GmbH, Detmold (DE)

(72) Inventors: Stefan Rose, Warstein (DE); Ulrich Windmöller, Schloss Holte-Stukenbrock (DE); Georg Kruse, Herford (DE)

(73) Assignee: WPT GmbH, Detmold (DE)

( * ) Notice: Subject to any disclaimer, the term of this patent is extended or adjusted under 35 U.S.C. 154(b) by 103 days.

(21) Appl. No.: 15/347,846

(22) Filed: Nov. 10, 2016

(65) Prior Publication Data

US 2017/0136731 A1 May 18, 2017

(30) Foreign Application Priority Data

Nov. 13, 2015 (DE) .................... 20 2015 106 139 U

(51) Int. Cl.
*B32B 5/02* (2006.01)
*B32B 27/40* (2006.01)
*B32B 7/12* (2006.01)
*B32B 27/12* (2006.01)
*E04B 1/84* (2006.01)
(Continued)

(52) U.S. Cl.
CPC .............. *B32B 27/12* (2013.01); *B32B 5/022* (2013.01); *B32B 5/028* (2013.01); *B32B 7/12* (2013.01); *B32B 27/40* (2013.01); *E04B 1/8409* (2013.01); *E04B 5/00* (2013.01); *E04F 15/182* (2013.01);
(Continued)

(58) Field of Classification Search
CPC .... E04F 15/182; E04F 15/186; E04B 1/8409; E04B 5/00; B32B 2307/718; B32B 2471/00; B32B 27/12; B32B 27/40; B32B 5/022; B32B 5/028; B32B 5/245; B32B 5/02; B32B 7/04; B32B 7/06; B32B 7/12
See application file for complete search history.

(56) References Cited

U.S. PATENT DOCUMENTS 4,880,683 A * 11/1989 Stow .......................... C09J 7/10
428/200
5,082,705 A * 1/1992 Rose .................. A47G 27/0468
428/41.3
(Continued)

FOREIGN PATENT DOCUMENTS

DE 29904628 U1 7/1999
DE 29908733 U1 9/1999
(Continued)

OTHER PUBLICATIONS

Product Catalogue "Trittschalldämmungen & Parkettunterlagsbahnen, Produkte 2009/2010" of the firm ewifoam (E. Wicklein GmbH).
(Continued)

*Primary Examiner* — Jennifer A Steele
(74) *Attorney, Agent, or Firm* — Richard M. Goldberg

(57) ABSTRACT

An underlay mat (10) for floor coverings, includes a polyurethane layer (14), a nonwoven backing (18) on the underside of polyurethane layer (14), a self-adhesive film (20) on the topside of the polyurethane layer (14) and which includes a carrier film (12), a layer of adhesive (22) applied to carrier film (12), and a mesh structure (24) made of fibers which is embedded in the adhesive layer (22), and a removable protective film (26) on the topside of self-adhesive film (20).

9 Claims, 1 Drawing Sheet

(51) Int. Cl.
   *E04B 5/00*        (2006.01)
   *E04F 15/18*     (2006.01)

(52) U.S. Cl.
   CPC ...... *E04F 15/186* (2013.01); *B32B 2307/718* (2013.01); *B32B 2471/00* (2013.01)

(56) References Cited

U.S. PATENT DOCUMENTS

| | | | |
|---|---|---|---|
| 2002/0081410 A1* | 6/2002 | Buckwalter | A47G 27/0468 428/40.1 |
| 2003/0232171 A1* | 12/2003 | Keith | B32B 5/26 428/95 |
| 2008/0124530 A1* | 5/2008 | Paradis | B32B 5/18 428/213 |
| 2009/0029097 A1* | 1/2009 | Riddle | C08G 18/2815 428/95 |
| 2009/0047464 A1 | 2/2009 | Foxall et al. | |

FOREIGN PATENT DOCUMENTS

| | | | |
|---|---|---|---|
| DE | 29919038 U1 | 4/2001 | |
| DE | 102005002303 A1 | 7/2006 | |
| DE | 102005023661 A1 | 11/2006 | |
| DE | 202007018098 U1 | 6/2009 | |
| EP | 0657281 A1 * | 6/1995 | ............ B32B 5/18 |
| EP | 0864712 A2 | 6/1998 | |
| EP | 0629755 B1 | 10/1998 | |
| FR | 2805836 A1 | 9/2001 | |
| FR | 2831909 A1 | 5/2003 | |
| PL | 191021 B1 | 3/2006 | |
| WO | 00/70168 A1 | 11/2000 | |
| WO | 2014/117181 A1 | 1/2014 | |

OTHER PUBLICATIONS

YouTube Video "Installing Hardwood Floors on Concrete—Elastilon" of a user "suprafloors", published Sep. 13, 2010, retrievable under https://www.youtube.com/watch?v=Rf11V0dY1Tg—sequential screen shots.

YouTube Video "Bauhaus TV—Produktvideo: Klebematte Elastilon" of a user "Bauhausinfo", published Aug. 28, 2013, retrievable under https://www.youtube.com/watch?v=5avP2nirA_Y—sequential screen shots.

* cited by examiner

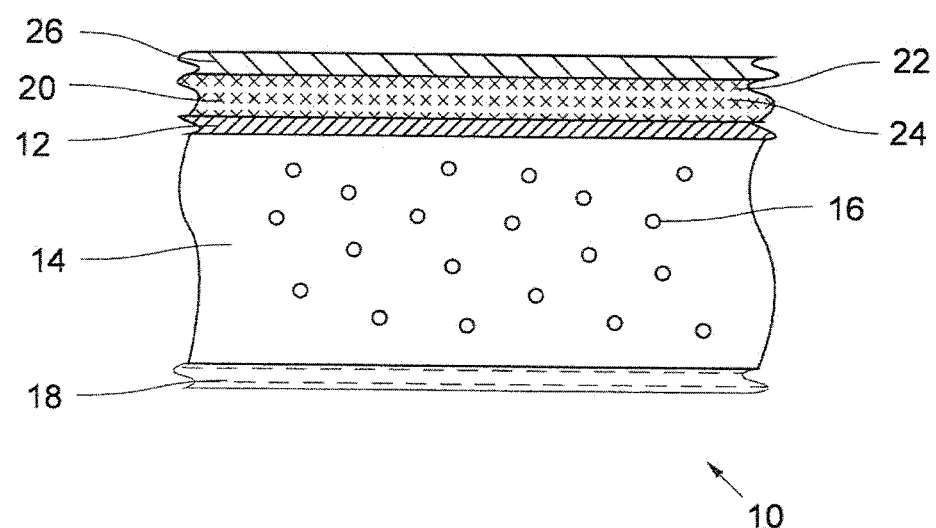

UNDERLAY MAT FOR FLOOR COVERINGS

BACKGROUND OF THE INVENTION

The present invention concerns an underlay mat for floor coverings.

Floor coverings exist in a large variety of embodiments. In addition to the very widely used floor panels made of wood or wood composites, increasing use is also made of coverings made from plastic materials such as PVC and, more recently, polyurethane (PU). As a general rule, these floor coverings are bonded directly to the substrate by means of, for example, a liquid adhesive applied to the floor screed.

Floors of this type, however, exhibit insufficient footfall sound insulation and reduction in walking noise. Walking comfort is also unsatisfactory. Furthermore, the process of laying the floor covering should be as easy, rapid and clean as possible, and when using a liquid adhesive this is only possible with great care and a lot of experience. It is also desirable to be able to use a floating technique to lay flexible floor covering elements of the above-mentioned type, e.g. as used for wood panels with locking profiles. It has not been possible to do this so far using known means. The underlay mats used for the floating installation of laminate floors cannot be used for plastic flooring, for example, because they do not meet the desired requirements. A mat of this type should exhibit good characteristics in terms of footfall sound insulation and absorption of walking noise whilst also being very thin, remaining permanently elastic and flexible in order to compensate for occasional unevenness in the substrate, and having good rebound characteristics to counteract occasional loads. Further desirable characteristics include easy removal of the floor covering and high dimensional stability.

In connection with plastic floors, increased requirements in terms of their environmental compatibility represent an additional challenge. PVC materials, for example, often contain harmful substances such as e.g. plasticizers, which are considered to be detrimental to health. The underlay mat should be as free as possible of such materials considered harmful to the environment and human health, without impairment to mechanical properties such as flexibility and elasticity. At the same time, it should not itself be damaged in any way by emissions emanating from the floor coverings laid on top of it, such as PVC floors, which may penetrate downward into the mat. There is a risk, for example, that the underlay mat is destroyed over time by the aforementioned plasticizers or other substances.

Hence it is a task of this invention to provide a novel type of underlay mat for floor coverings, which is easy and clean to lay and practically 100% emission-free, and is not impaired in any way by the emissions from a floor covering laid on top of it, so that it retains the desired mechanical properties over time. This underlay mat should also meet the above-mentioned requirements in terms of footfall sound insulation, walking noise reduction, elasticity, rebound characteristics, dimensional stability and ease of removal.

According to the invention, these tasks are solved by an underlay mat with the features of the claims.

SUMMARY OF THE INVENTION

The underlay mat according to the invention comprises a layer of polyurethane (PU) which ensures the essential characteristics in terms of footfall sound insulation, walking comfort, elasticity, flexibility and residual indentation properties. The use of polyurethane for this layer is a great advance over plastics which contain environmentally harmful additives. One may, in particular, use polyurethane that is made from renewable raw materials such as rape and castor oils, and contains no harmful additives such as plasticizers, formaldehyde, heavy metals or similar. This means the polyurethane layer is entirely emission-free and exceptionally environmentally-friendly, without having to compromise on its noise-inhibiting properties or its stability. In particular, the polyurethane layer may be very flexible and elastic whilst still providing a stable, insulating layer once laid.

Underneath the layer of polyurethane there is a layer of nonwoven backing. On its topside there is a self-adhesive film comprising a carrier film, a layer of adhesive applied on top of the carrier film and a mesh structure made of fibers which is embedded in the adhesive layer. The adhesive serves to create a bond with the floor covering placed on top of the underlay mat. This means that the underlay mat according to the invention comes ready to use for laying the floor covering, i.e. there is no need to apply a liquid adhesive. The adhesive layer is stabilized by the mesh structure. With a suitable choice of adhesive, initial corrections remain possible while laying the floor covering elements. Subsequent hardening of the adhesive creates the desired stable bond between the finished installed floor covering and the underlay mat.

The topside of the self-adhesive film is covered by a removable protective film. This ensures that the underlay mat is easy to handle, e.g. as a rolled-up length of material. The protective film can be removed after or during unrolling to expose the self-adhesive film.

The underlay mat according to the invention offers an optimum combination of flexibility, elasticity and stability. The latter is ensured by the carrier film and the mesh structure in particular.

According to a preferred embodiment of the present invention the polyurethane layer contains, in addition to polyurethane (PU), mineral fillers to add weight. These fillers may be sand or chalk, for example.

The density of the polyurethane layer including fillers is preferably up to 1800 kg/m$^3$.

Further, the specific weight of the polyurethane in the polyurethane layer is preferably 800 to 1200 kg/m.

Further, the thickness of the polyurethane layer is preferably 1 to 5 mm, preferably about 2 mm.

According to another preferred embodiment of the invention, the carrier film is made from polyethylene terephthalate (PET).

According to another preferred embodiment of the invention, the adhesive used in the self-adhesive film is an acrylic adhesive.

Further, the carrier film is preferably applied direct to the topside of the polyurethane layer. This forms a solid bond between the stable carrier film and the polyurethane layer, which can exhibit elastic characteristics.

According to another preferred embodiment, the nonwoven backing is attached directly to the underside of the polyurethane layer and forms the underside of the underlay mat. Any unevenness in the substrate on which the underlay mat is laid can thus press through the nonwoven backing into the polyurethane layer. This allows the underlay mat to adapt well to uneven substrates.

BRIEF DESCRIPTION OF THE DRAWINGS

A preferred embodiment of the invention will be described in more detail below with reference to the drawing.

The one and only drawing is a schematic cross-section through an embodiment of the underlay mat according to the invention.

DETAILED DESCRIPTION

The underlay mat shown in this drawing is designated as a whole by the number 10. It takes the form of a layered structure containing layers of different materials with different mechanical and chemical properties and which will be explained in more detail below.

The underlay mat 10 is shown as oriented during the process of installation, i.e. the side in contact with the substrate (e.g. screed) is its underside, which is at the bottom of the drawing, whilst a floor covering not shown in further detail is placed on its topside. The terms "underside" and "topside" as used here and elsewhere in the application should not, however, be understood as limiting the present invention to a specific orientation of underlay mat 10, but serve solely to visually differentiate the opposite sides of underlay mat 10. Further, the thicknesses of the layers and the proportions are not presented to scale in the drawing and are similarly not limiting.

Specifically, underlay mat 10 comprises a polyurethane layer 14, made from polyurethane (PU) and additional mineral fillers 16 such as sand or chalk, which have a higher density than the polyurethane and hence increase the weight of the polyurethane layer 14 and the entire underlay mat 10. Fillers 16 are distributed within the polyurethane layer 14 in a relatively homogeneous fashion. They are shown in a purely schematic manner in the drawing, which does not provide a to-scale representation of the density of their distribution.

Polyurethane layer 14, including fillers 16, has a density of up to 1800 kg/m$^3$. The polyurethane contained therein has a density of between 800 and 1200 kg/m$^3$. Its thickness is between 1 and 5 mm, and is advantageously around 2 mm.

The underside of polyurethane layer 14, which, in FIG. 1, is disposed at the bottom as would usually be the case when laying underlay mat 10, is covered by a nonwoven backing 18. Nonwoven backing 18 forms a relatively soft fiber mat which can be stuck to the underside of polyurethane layer 14 by means of a spray adhesive, for example. Hence the underside of underlay mat 10 is made of relatively soft materials. In this manner, any unevenness in the substrate on which underlay mat 10 is laid can press into nonwoven backing 18 and even into polyurethane layer 14. Underlay mat 10 thus ensures good compensation of this sort of unevenness.

Attached to the topside of polyurethane layer 14 there is a self-adhesive film 20 comprising a carrier film 12, a layer of adhesive 22 disposed on top of carrier film 12 and a mesh structure 24 embedded therein. Mesh structure 24 consists of loosely arranged fibers, i.e. arranged with relatively large spacing, which are easily permeated by the adhesive. The adhesive of the adhesive layer 22 may be an acrylic adhesive, for example. Hence the bonding properties and fluidity are not impaired by mesh structure 24. Further, mesh structure 24 ensures additional stability of the layer structure of underlay mat 10 in its upper cross-section area.

The topside of self-adhesive film 20 is covered by a protective film 26, which can be removed by hand. Protective film 26 is thus attached only to adhesive 22 of self-adhesive film 20 and is not solidly bonded to the latter. Once the protective film 26 is removed, self-adhesive film 20 provides an adhesive surface for receiving and bonding with a floor covering to be placed on top of it.

When using an acrylic adhesive for adhesive layer 22, as in the present embodiment example, the position of a floor element such as a floor panel placed on top of self-adhesive film 20 can be corrected immediately after removing protective film 26, i.e. it can be moved sidewards to a certain extent until it reaches a final position. After the acrylic adhesive hardens, a solid layer bonding is formed between the floor covering and the underlay mat 10 disposed underneath, which ensures advantageous properties for the finished laid floor. Given that nonwoven backing 18 on the underside of underlay mat 10 simply lies loose on top of the substrate, the flooring can be removed without leaving any residual material.

Acrylic adhesive is also very resistant to plasticizers, which can be emitted from PVC (polyvinyl chloride) floor coverings in particular. Hence this underlay mat 10 is well suited to laying PVC floor coverings of this type.

Despite relatively low thickness, underlay mat 10 is heavy with good flexibility and resilience, so that it can easily be rolled up and transported for use on site. The layers in the top cross-section area, in particular carrier film 12 and mesh structure 24 embedded in self-adhesive film 20, provide it with high stability and good resistance to occasional mechanical loads. The polyurethane layer 14 underneath ensures sufficient elasticity.

Product Example

A product with the layer structure according to the present invention, as described above and illustrated in the drawing, may have e.g. the following technical specifications.

| | |
|---|---|
| Thickness: ~1.80 mm (±0.15 mm) | DIN CEN/TS 16354 |
| Weight per unit area: ~2.60 kg/m$^2$ (±0.15 kg/m$^2$) | |
| Length: up to 8,500 mm (±15.00 mm) | DIN CEN/TS 16354 |
| Width: 1,000 mm (±1.00 mm) | DIN CEN/TS 16354 |
| Walking noise reduction: up to 6% (±2%) | EPLF Norm WD 021029-5 |
| Footstep noise reduction: up to 15 dB (±2 dB) | DIN EN 16251-1 |
| Thermal resistance: 0.01 m$^2$K/W | DIN CEN/TS 16354 (suitable for underfloor heating) |
| Residual indentation: <0.20 mm | (DIN EN 3385) |
| Resistance to pressure: >45 t/m$^2$ (>450 kPa) | DIN EN 826 |
| Resistance to pressure-creep deformation: >55 kPa | DIN CEN/TS 16354 |
| Resistance to dynamic loads: >100,000 cycles | DIN CEN/TS 16354 |
| Resistance to impact: ~750 mm | DIN CEN/TS 16354 |
| Compensation of occasional unevenness: ~0.55 mm | DIN CEN/TS 16354 |
| Fire classification: Efl | DIN EN 13501-1 (without top layer) |

This product can easily be cut to shape using a cutter. The product is permanently resistant to plasticizers and the adhesive layer exhibits low initial adhesion to allow any corrections that might be necessary. The adhesive action increases until complete solid bonding of the top layer. This underlay mat is suitable for use underneath PVC cuts (dryback), LPT, LUT and laminate systems.

The invention claimed is:

1. An underlay mat for floor coverings, comprising:
   a polyurethane layer,
   a nonwoven backing on an underside of the polyurethane layer,
   a self-adhesive film on a topside of the polyurethane layer, the self-adhesive film comprising a carrier film, a layer of adhesive applied to the carrier film, and a mesh structure made of fibers which is embedded in the adhesive layer, and
   a removable protective film on a topside of the self-adhesive film, wherein the adhesive in the self-adhesive film is an acrylic adhesive which, after removal of the protective layer, permits sidewards movement of the floor coverings thereon when the floor coverings are initially installed thereon and which hardens thereafter to affix the flooring coverings thereon.

2. An underlay mat according to claim 1, wherein the polyurethane layer includes polyurethane, and mineral fillers to add weight.

3. An underlay mat according to claim 2, wherein the polyurethane layer including fillers has a specific weight up to 1800 kg/m$^3$.

4. An underlay mat according to claim 1, wherein the polyurethane layer includes polyurethane having a specific weight of 800 to 1200 kg/m$^3$.

5. An underlay mat according to claim 1, wherein the polyurethane layer has a thickness of 1 to 5 mm.

6. An underlay mat according to claim 4, wherein the polyurethane layer has a thickness of approximately 2 mm.

7. An underlay mat according to claim 1, wherein the carrier film is made from polyethylene terephthalate (PET).

8. An underlay mat according to claim 1, wherein the carrier film is applied directly to the topside of the polyurethane layer.

9. An underlay mat according to claim 1, wherein the nonwoven backing is applied direct to the underside of the polyurethane layer and forms an underside of the underlay mat.

* * * * *